United States Patent [19]

Moore

[11] 4,254,607
[45] Mar. 10, 1981

[54] LOW NOISE PRODUCING LAWN MOWER BLADE

[75] Inventor: James W. Moore, Horicon, Wis.
[73] Assignee: Deere & Company, Moline, Ill.
[21] Appl. No.: 68,773
[22] Filed: Aug. 21, 1979
[51] Int. Cl.³ .............................................. A01D 55/18
[52] U.S. Cl. .................................................... 56/295
[58] Field of Search ................................. 56/295, 13.4
[56] References Cited
U.S. PATENT DOCUMENTS

| | | | |
|---|---|---|---|
| 2,908,128 | 10/1959 | Mauro | 56/295 |
| 3,220,170 | 11/1965 | Smith et al. | 56/295 |
| 3,445,992 | 5/1969 | Hanson et al. | 56/295 |
| 3,636,685 | 1/1972 | Speckman | 56/295 |
| 4,149,358 | 4/1979 | Comer | 56/295 |

Primary Examiner—Jay N. Eskovitz

[57] ABSTRACT

A lawn mower blade includes a leading flat portion, at each of its opposite ends, sharpened to define a cutting edge and a trailing vane is joined to and is angled upwardly in trailing relationship to each flat portion. In one embodiment, the vanes are each in the form of a lift wing and perforations or holes are located in the leading flat portion ahead of the lift wing and provide air pressure relief passages. In another embodiment the vanes include lift wings and bagging paddles joined to the lift wings and including second leading flat portions to which trailing fins are joined. The second leading flat portion is either recessed to form a space between outer end portions of the fin and flat portion or is perforated to provide air pressure relief passages.

7 Claims, 5 Drawing Figures

U.S. Patent  Mar. 10, 1981  4,254,607

LOW NOISE PRODUCING LAWN MOWER BLADE

BACKGROUND OF THE INVENTION

The invention relates to rotary mower blades of the type including vanes for creating air movement to lift grass into position for being cut by the blade and for blowing the cut grass into a bag.

It is becoming more and more popular to cut grass with mowers having the capability to bag the grass clippings. In order to increase the efficiency of the bagging capabilities of these mowers, they are often provided with blades having relatively large vanes or paddles for creating the necessary air flows.

However, these existing mower blades are very noisy in operation and often exceed new noise limits soon to be imposed by industry and/or various governmental bodies.

SUMMARY OF THE INVENTION

According to the present invention, there is provided a novel mower blade for use with bagging mowers.

A broad object of the invention is to provide a bagging mower having a blade which generates a relatively low level of noise.

A more specific object is to provide a mower blade having vanes for creating an air flow sufficient for lifting grass to be cut and for bagging the cuttings and to provide air pressure relief passage means for reducing the pressure of the air ahead of the vanes.

These and other objects will become apparent from reading the ensuing description together with the appended drawing.

DESCRIPTION OF THE PREFERRED EMBODIMENTS

Figure 1:
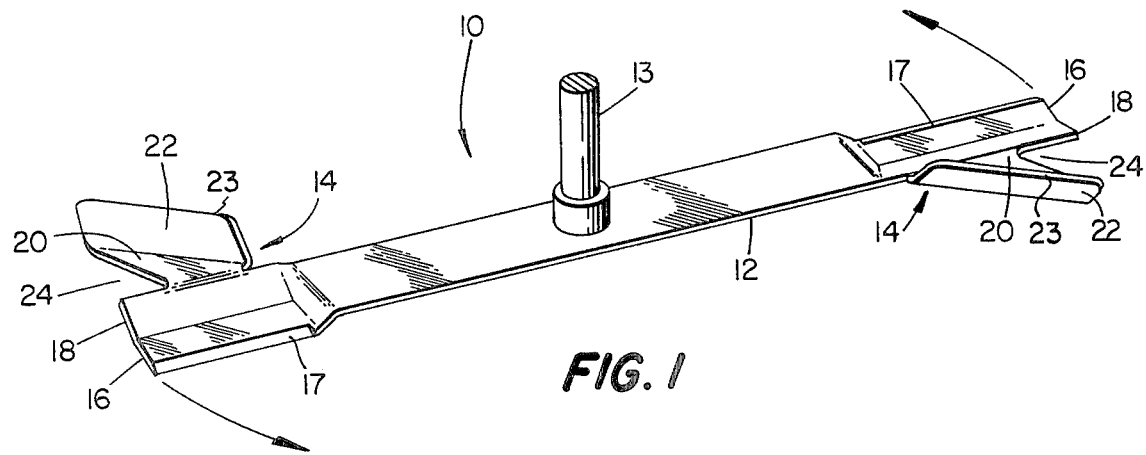
FIG. 1 is a perspective view of a mower blade having vanes comprising lift wings and paddles embodying the principles of the present invention.

Referring now to FIG. 1, therein is shown a mower blade 10 comprising a flat central section 12 fixed medially of its opposite ends to a vertical spindle 13 and having its opposite ends joined to opposite end portions 14. Each of the end portions 14 is formed to define, as considered relative to the direction of rotation of the blade indicated by the arrows, a first leading flat portion 16 sharpened to define a cutting edge 17, a lift wing 18 joined to and angled upwardly in trailing relationship to the portion 16, a second leading flat portion 20 joined to the wing 18 in trailing relationship thereto, and a fin 22 joined to and angled upwardly in trailing relationship to the portion 20 and terminating in a trailing edge portion 23. The flat portion 20 and fin 22 cooperate to define a paddle, which cooperates with the lift wing 18 to define a vane.

In accordance with a first embodiment of the present invention, the flat portion 20 of the paddle is shaped and joined to the lift wing 18 and fin 22 such as to define a recess 24 which extends inwardly between the wing and fin generally toward the spindle 13 from the outermost extremities of the end section 14. The recess 24 serves as an air pressure relief passage which serves to substantially reduce the pressure profile as would occur in front of the fin 22 during rotation of the blade 10 in the absence of the recess 24.

Figure 2:
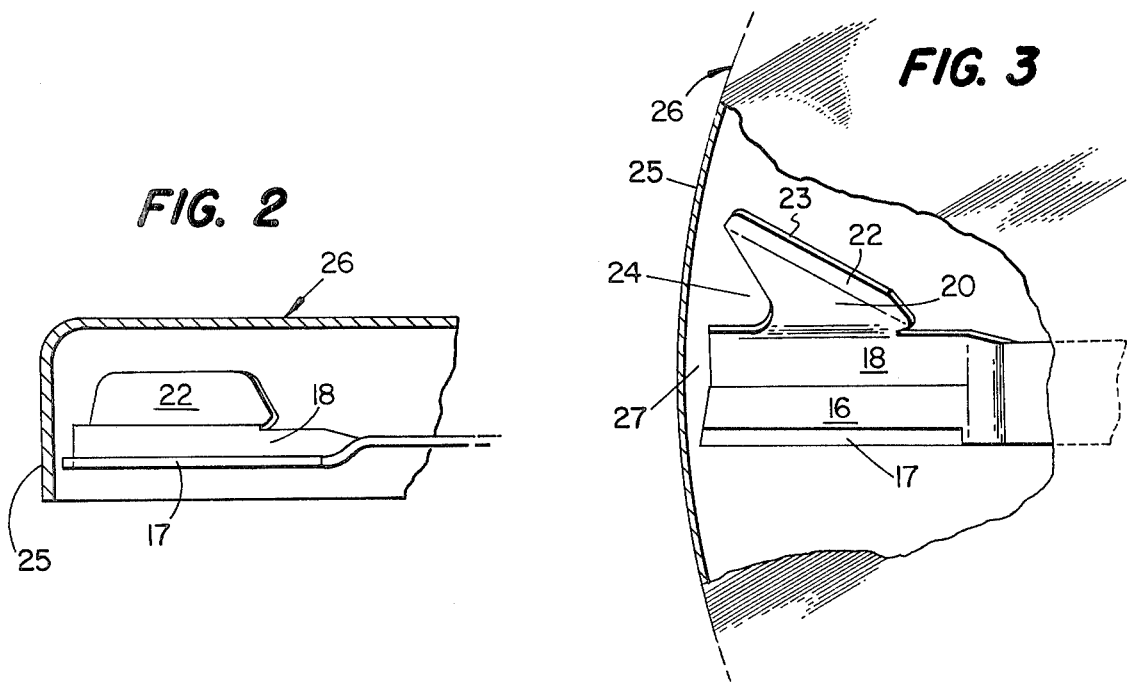
FIG. 2 is an elevational view showing the relationship of one end of the blade to a mower housing shown in section.
Figure 3:
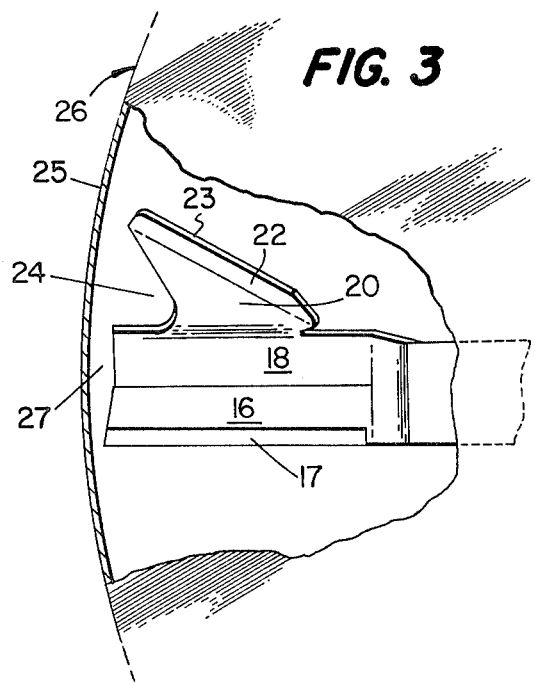
FIG. 3 is a top plan view of the blade end and housing shown in FIG. 2 with a portion of the housing broken away to reveal the blade end.

Referring now to FIGS. 2 and 3, it can be seen that the outermost surfaces of the end portions 14 of the blade 10, as considered from the cutting edge 17 to the fin 22, are spaced increasingly inwardly toward the spindle 13 from a skirt 24 of a blade housing 26 to thereby cooperate with the recess as a pressure relief passage.

Figure 4:
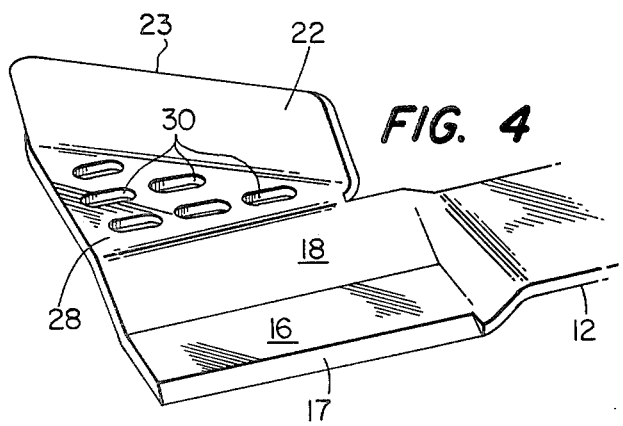
FIG. 4 is a perspective view variant of the vane illustrated in FIGS. 1-3.

Referring now to FIG. 4, therein is shown a variant of the paddle wherein a second flat portion 28 is substituted for the previously described flat portion 20 and differs from the latter in that it is not configured to define a recess between the wing 18 and fin 22, but rather is provided with a plurality of perforations or holes 30 which serve as air pressure relief passages.

Figure 5:
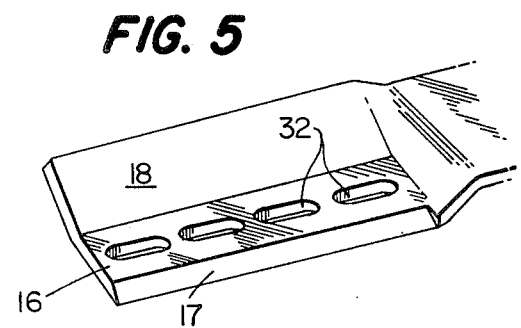
FIG. 5 is a perspective view of a blade end having a vane comprising only a lift wing.

Referring now to FIG. 5, therein is shown a variant of the end portion 14 of the blade wherein the paddle is omitted and a plurality of perforations or holes 32 are provided in the first flat portion 16 so as to provide pressure relief passage means for the pressure profile created by the lift wing 18.

While the recess 24, perforations 30 and perforations 32 have all been illustrated as occurring separately, it is to be understood that any combination of the three ways of providing air pressure relief may be employed.

The operation of the invention is thought to be evident from the foregoing description and, for the sake of brevity, no further description of the operation is given.

I claim:

1. In a rotary mower blade adapted for rotation about an upright axis and having opposite end portions each including a first leading flat portion sharpened to define a cutting edge and a trailing lift wing joined to and angled upwardly in trailing relationship to the leading flat portion, the improvement comprising: a bagging paddle joined to each lift wing; each paddle including a second leading flat portion joined to the lift wing and a trailing fin angled upwardly in trailing relationship to the second leading flat portion; and air pressure relief means defined in the second leading flat portion ahead of the fin.

2. The rotary mower blade defined in claim 1 wherein the second leading flat portion of each end portion is recessed inwardly toward a central location of the blade spaced equidistant from the opposite end portions thereof relative to an imaginary line joining respective outermost surfaces of the lift wing and the fin to thereby define at least a portion of said air pressure relief means.

3. The rotary mower blade defined in claim 1 wherein a plurality of perforations are located in the second leading flat portion to thereby define at least a portion of said air pressure relief means.

4. The rotary mower blade defined in claim 1 wherein an outermost surface of the cutting edge of each of the opposite end portions is spaced outwardly from the central location a distance greater than the outermost surfaces of the lift wing and fin to thereby define a further portion of the pressure relief means.

5. The rotary mower blade defined in claim 2 wherein an outermost surface of the cutting edge of each of the opposite end portions is spaced outwardly from the central location a distance greater than the outermost surfaces of the lift wing and fin to thereby define a further portion of the pressure relief means.

6. In an elongate mower blade having a mounting portion located centrally between opposite ends thereof, leading cutting edge portions at opposite ends thereof located for sweeping through a common plane and trailing vanes respectively located behind the cutting edge portions and inclined upwardly from the plane and terminating in trailing edge portions, the improvement comprising: an air pressure relief notch formed between the cutting edge portion and trailing vane at each end of the blade and extending inwardly toward the mounting portion from an outermost end surface of the blade considered relative to the mounting portion.

7. The mower blade defined in claim 6 wherein the extent of each notch inwardly toward the mounting portion of the blade is less than the extent of the adjacent upwardly inclined e.

* * * * *

UNITED STATES PATENT AND TRADEMARK OFFICE
CERTIFICATE OF CORRECTION

PATENT NO. : 4,254,607

DATED : 10 March 1981

INVENTOR(S) : James W. Moore

It is certified that error appears in the above—identified patent and that said Letters Patent is hereby corrected as shown below:

Column 4, line 12, delete "e" and insert -- vane --.

Signed and Sealed this

Thirtieth Day of March 1982

[SEAL]

Attest:

Attesting Officer

GERALD J. MOSSINGHOFF

Commissioner of Patents and Trademarks